No. 876,541. PATENTED JAN. 14, 1908.
F. C. GREENE & C. G. PALMER.
WEIGH PAN.
APPLICATION FILED AUG. 18, 1905.

3 SHEETS—SHEET 1.

WITNESSES:
Edw. Lindmueller.
Jno. F. Oberlin.

INVENTORS
Frank C. Greene
Charles G. Palmer
by J. D. Fay
THEIR ATTORNEY

No. 876,541. PATENTED JAN. 14, 1908.
F. C. GREENE & C. G. PALMER.
WEIGH PAN.
APPLICATION FILED AUG. 18, 1905.
3 SHEETS—SHEET 2.
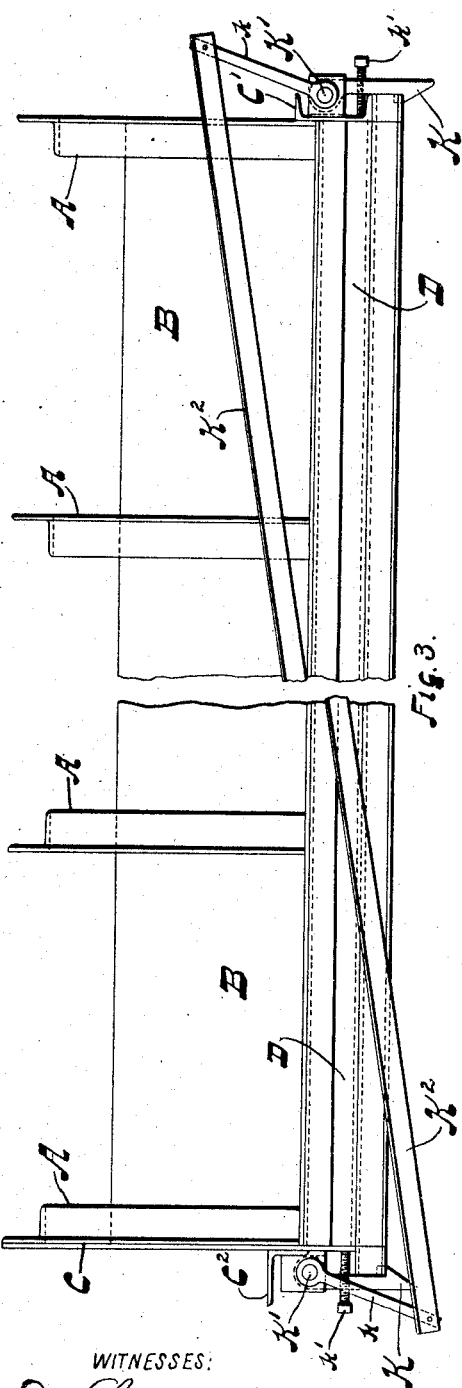
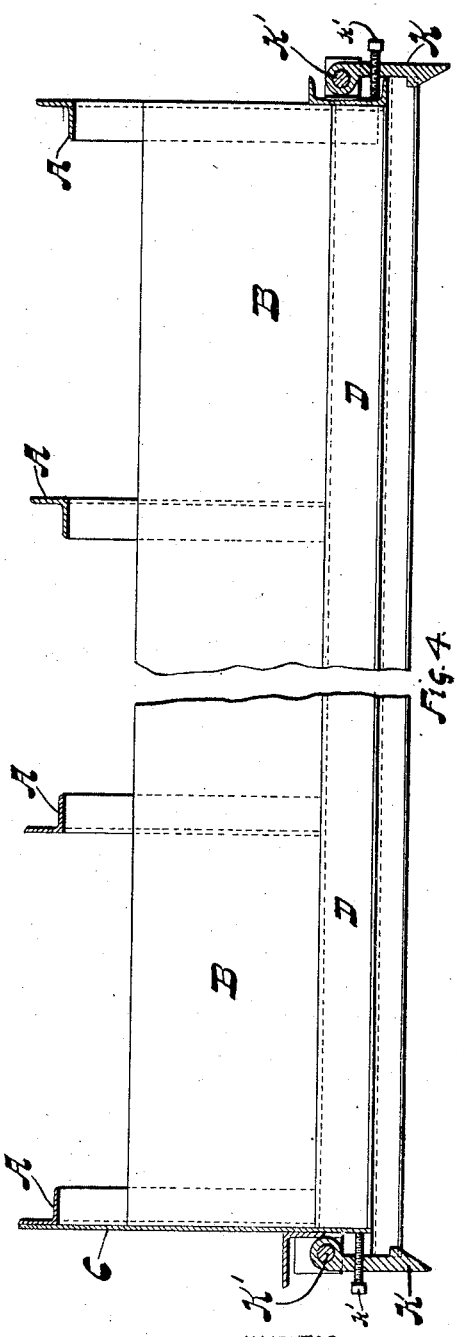
WITNESSES:
Edw. Lindmueller.
Jno. F. Oberlin.
INVENTORS
Frank C. Greene
and Charles G. Palmer
by J. D. Fay
THEIR ATTORNEY No. 876,541.
PATENTED JAN. 14, 1908.
F. C. GREENE & C. G. PALMER.
WEIGH PAN.
APPLICATION FILED AUG. 18, 1905.
3 SHEETS—SHEET 3.
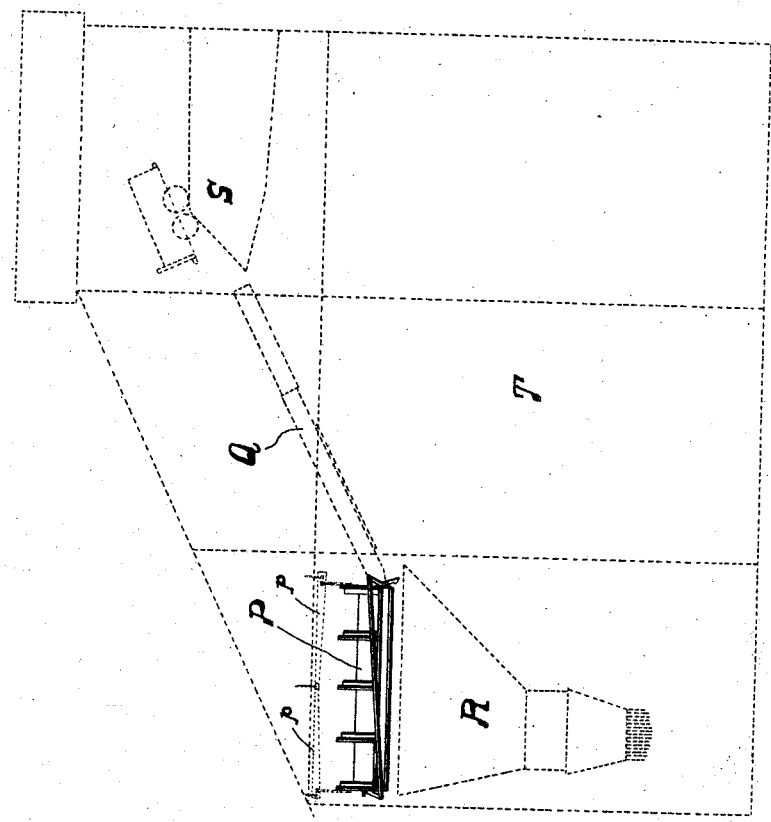
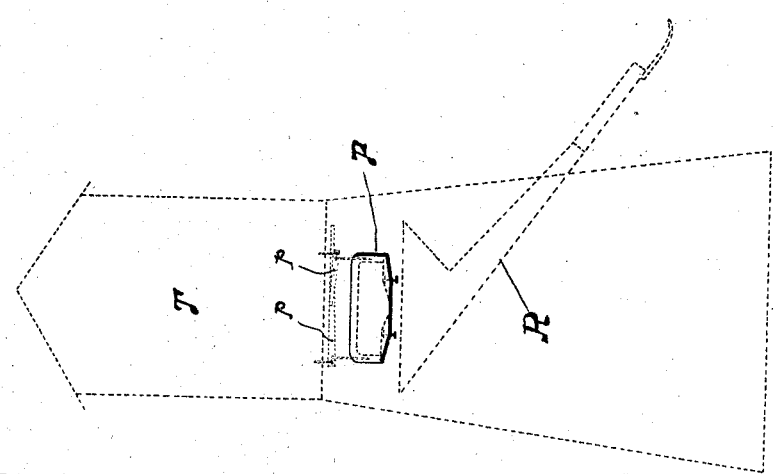
WITNESSES:
Robt N Millard
Jno. F. Oberlin
INVENTORS
Frank C. Greene & Charles G. Palmer
BY
J. D. Fay
ATTORNEY

UNITED STATES PATENT OFFICE.

FRANK C. GREENE, OF CLEVELAND, AND CHARLES G. PALMER, OF EAST CLEVELAND, OHIO, ASSIGNORS, BY MESNE ASSIGNMENTS, TO SAID GREENE.

WEIGH-PAN.

No. 876,541.  Specification of Letters Patent.  Patented Jan. 14, 1908.

Application filed August 18, 1905. Serial No. 274,682.

*To all whom it may concern:*

Be it known that we, FRANK C. GREENE and CHARLES G. PALMER, both citizens of the United States, residents of Cleveland and East Cleveland, respectively, county of Cuyahoga, and State of Ohio, have invented a new and useful Improvement in Weigh-Pans, of which the following is a specification, the principle of the invention being herein explained and the best mode in which we have contemplated applying that principle so as to distinguish it from other inventions.

Our invention relates to weigh-pans, and particularly to weigh-pans such as are employed for weighing coal in the tipple of a coal mine and in like situations. In such tipples the coal, after being dumped from the mine car, is usually passed over an inclined screen in order to separate the slack, and is then received in a weigh-pan or basket, from which, upon its weight being determined, it is discharged into a bin or car beneath. Such weigh-pan, as needs scarcely be explained, is mounted in a suitable weighing machine, the scale of which is located in a weigh-box placed where most convenient in the tipple structure.

The object of our invention is to provide a weigh-pan that can be easily and quickly dumped of its contents from any desired station in the tipple, and that at the same time will be economical of space.

To the accomplishment of these ends it consists of means hereinafter fully described and particularly set forth in the claims.

The annexed drawings and the following description set forth in detail certain mechanism embodying the invention, such disclosed means constituting but one of various mechanical forms in which the principle of the invention may be used.

Figure 1:
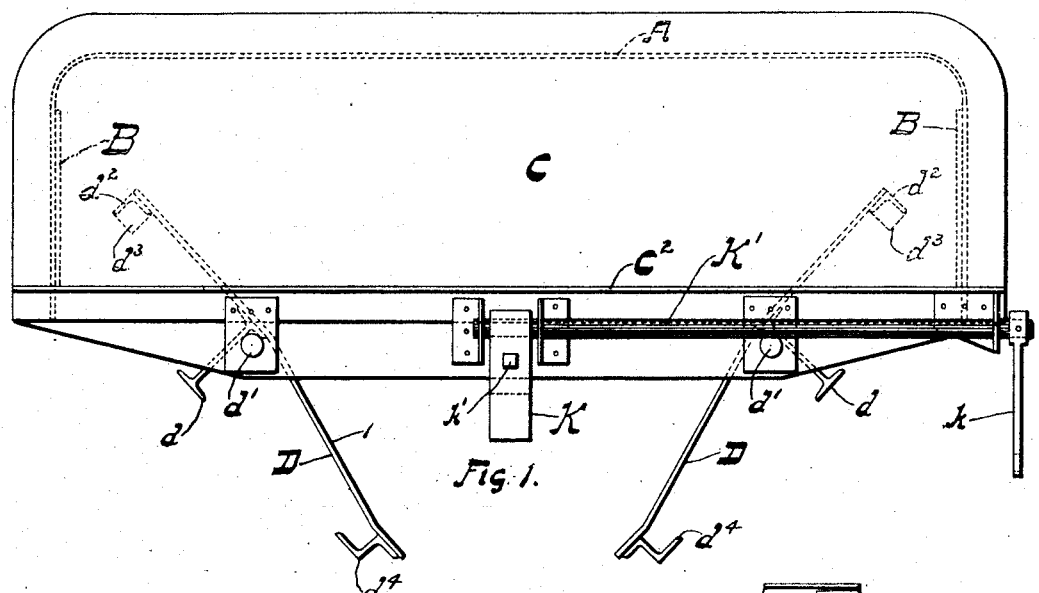
Figure 5:
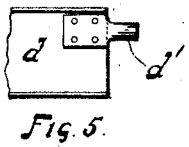
Figure 2:
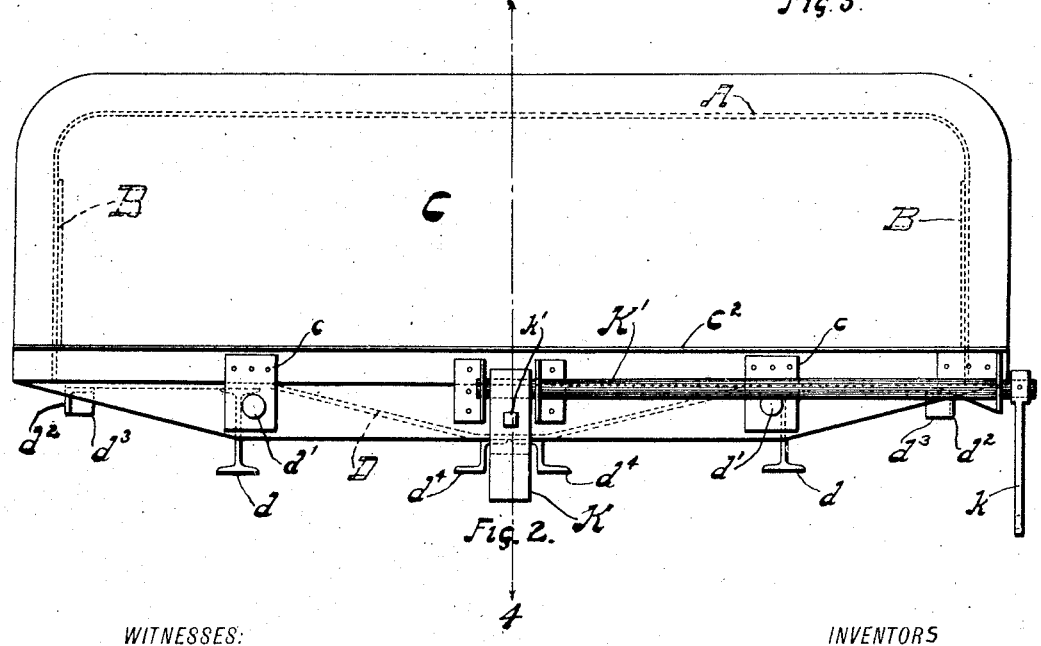

In said annexed drawings:—Figure 1 represents a front end view of our improved weigh-pan arranged to discharge its contents; Fig. 2 shows the same closed and ready to receive a load; Fig. 3 is a side elevation of our weigh-pan; Fig. 4 is a vertical longitudinal cross section of the same cut by a plane passing through the line 4—4, Fig. 2; Fig. 5 shows, in connection with the beam to which it is attached, a side view of one of the hinge pins upon which the bottom members of the pan are pivoted; while Figs. 6 and 7 are respectively an end view and a side elevation of said weigh-pan as disposed in a coal-mine tipple, the outlines, merely, of the tipple structure being indicated.

Such tipple structure is designated in general by the reference letter T, the form there shown, however, being chosen merely for the purpose of illustration. It does not form any part of our present application. Loaded cars from the mine are intended to be introduced near the top of the structure onto dumping station S. The coal after being discharged from the car passes over a series of screens Q, whereby the slack is separated out, and is thereupon received in the weigh-pan P. Thence, after its weight has been determined, it is discharged into a chute R which conveys it either to bins in the lower part of the tipple or else, as is more usually the case directly into railway cars. Weigh-pan P is suspended from levers *p p* forming a part of a scale mechanism of the familiar lever type.

The weigh-box, not shown, is located at some convenient station in the tipple structure, and it is from this station that the improved weigh-pan which forms the subject of this present invention is designed to be operated. Before proceeding with the description of such weigh-pan, it may be well to indicate the type of device that it is expected to supplant therewith. Heretofore where weigh-pans have been used, they have generally taken the form of an elongated "basket" continuous with the screen or chute down which the coal is discharged from the tipple dump. In its earlier from such basket was pivotally mounted at one end and supported at the other by means of a rope or chain passing over a pulley and having a counterweight at its other end. Such basket was further so arranged as to be depressed by the weight of the coal and to thereupon automatically open and discharge its contents into the bin or car beneath. In a later development of the device, instead of having one end pivoted to a fixed support, such support has been made vertically movable just as the counterpoised end, the former automatic opening being secured by lowering the two ends at different rates of speed so as to discharge the basket as it descends towards the car.

The above described type of weigh-pan, as well as all others heretofore devised, of which applicants have knowledge, is objectionable in the first place because of the amount of space required by the movements of the pan in the operation of discharging, the provision of such space adding to the cost of the tipple or else taking up room that could otherwise be advantageously used for storage purposes; and in the second place, because of the time required for the basket to descend, open, ascend and finally close, which is considerable and limits the rapidity with which the coal can be handled.

As clearly shown in Figs. 1 to 4 inclusive of the drawings, the frame-work of our improved weigh-pan comprises essentially a series of yoke angles A which bend over the top and down the sides of the pan. These sides are formed of plates B secured to the legs of the yoke angles and on their inner surfaces. Only one end of the pan, as shown, is closed, the other being left open to receive the coal as it comes down the chute from the screen, and the pan as a whole may be downwardly inclined from this end to facilitate the even distribution of the coal therein. Such closure of the forward end is effected by means of an end plate C, Figs. 1 and 2, where such forward end of the pan is represented.

The legs of the two end yokes are tied together by means of cross bars consisting at the rear end of the pan, Fig. 3, of a channel bar $C'$, and at the forward end Figs. 1 and 2, of an angle bar $C^2$.

The bottom of the pan comprises two similar longitudinally disposed plates D D, bent in the manner shown in Figs. 1 and 2. These bottom plates are stiffened lengthwise by means of I-beams, $d\ d$, to the ends of which are riveted hinge pins $d'$, Fig. 5. These hinge pins turn in bearings formed at the rear end of the pan in channel bar $C'$ and at the forward and in the end plate C reinforced locally by small plates $c\ c$. It will thus readily appear that each of the bottom plates D is free to swing on a pivotal axis joining hinge pins $d'$. The outer longitudinal edge of each of these plates is protected by means of an L-bar $d^2$. To these are secured other bars $d^3$ which serve as counterweights whereby bottom plates D are normally held in a horizontal position so as to close the pan.

On the inner edges of the bottom plates, and therefore along the center line of the pan are riveted Z-bars $d^4$. These Z-bars extend beyond the bottom plates at each end of the pan, and are designed, in addition to strengthening such bottom plates, to be engaged by latches K when such plates are in their horizontal position whereby the bottom of the pan is held in a closed position. The aforesaid latches K are keyed to rock-shafts $K'$ transversely mounted, one at each end of the pan in suitable bearings there provided. A rod or bar $K^2$ attached to lever arms $k$, mounted on the ends of rock-shafts $K'$ as shown, Fig. 3, serves to coördinate the movement of the two latches which rest normally in a pendent position. To facilitate the engagement of the bottom plates as they return to their closed position, the inner edges of the latches are suitably beveled and tap bolts $k'$ screwed into the latches, prevent them from swinging in too far.

From the disposition of the hinge pins $d'$ on which the bottom plates are pivoted, it is evident that upon the pan being loaded a greater weight of coal will necessarily rest upon the inner portions of the plates than upon the outer. Consequently, upon releasing the plates by swinging the latches K outwardly, this excess of weight will cause such plates to tilt in the manner shown in Fig. 1, and so discharge the contents of the pan. By having the inner portions of the plates bent downwardly towards the center of the pan, an excess of weight is thereby further assured on the proper side of their pivotal axes to cause them to dump. In order to swing the latches K out in the manner above indicated, another lever arm, not shown, is preferably attached to one of the rock-shafts $K'$. This lever arm is connected by means of a rope, or in any other suitable manner, with an operating lever beside the weigh-box, by means of which shafts $K'$ may be rocked to swing latches K outwardly.

Having thus described the construction of our improved weigh-pan, the manner of its operation may be briefly indicated. As has been shown, the construction is such that the pan is normally closed. In this condition it is ready to receive the coal from the mine car which is dumped into it from the dumping station, over an intervening screen, since ordinarily the weight of the lump coal only is credited to the miner. Upon the weight of the coal in the pan being noted by the weigh-boss he pulls the lever beside the weigh-box and thereby dumps the contents of the pan into the bin or car beneath in the manner already fully set forth. As soon as they are relieved of the weight of the coal, the bottom plates D return of themselves to the horizontal position under the influence of the counter-weights $d^3$ and are automatically engaged and locked by latches K. The pan is thereupon ready to receive another load.

It will be observed that the pan as a whole is substantially stationary, its only movement being the slight one incidental to the counter-poising of the weighing mechanism. The opening and closing of the bottom of the pan, as contrasted with earlier types of pans, is made entirely independent of any such movement of the pan itself. We are thus able to conserve space since the mechanism occupies the same position and amount of room when being dumped as when being loaded. Moreover, the coal need not be dropped any great distance for the same reason. At the same time the pan is gravity-actuated and automatic, and hence requires no power to operate it or any attention other than the control of the locking device effected through the lever beside the weigh-box.

As a result of all these improvements in operation, we are enabled to transfer the coal from the mine car to a tipple bin or freight car much more rapidly than has heretofore been possible, and the saving of time thus effected is a very important consideration in the economical running of a mine.

Having thus described our invention in detail, that which we particularly point out and distinctly claim, is:

1. A weigh-pan comprising a receptacle having a bottom member lying within the planes of the sides of said receptacle and unsymmetrically pivoted on an axis intermediate of its own sides, said member being counterweighted so as to normally rest in a closed position when said receptacle is empty.

2. A weigh-pan comprising a receptacle having a bottom member lying within the planes of the sides of said receptacle and unsymmetrically pivoted on an axis intermediate of its own sides, said member being counterweighted so as to normally rest in a closed position when said receptacle is empty and to be swung into an open position by the contents of said receptacle when the latter is loaded; and independently controlled means adapted to retain said bottom member in its closed position.

3. A weigh-pan comprising a receptacle having a bottom member lying within the planes of the sides of said receptacle and pivoted on an axis intermediate of its own sides, such pivotal axis lying to one side of the center of gravity of said member, the portion of such member on the opposite side of such axis being adapted to receive an excess of the load when said receptacle is loaded.

4. A weigh-pan comprising a receptacle having a bottom member lying within the planes of the sides of said receptacle and pivotally attached at points intermediate of its own sides to said receptacle, and adapted to have an excess of weight on one side of its pivotal axis when said receptacle is empty whereby said member is swung shut, and to have an excess of weight on its other side when said receptacle is loaded, whereby said member is swung open; and independent means for retaining said member in its closed position.

5. A weigh-pan comprising a receptacle having a bottom composed of two members lying within the planes of the sides of said receptacle and respectively pivoted on axes intermediate of their sides, such members normally having an excess of weight on one side of their respective axes when said receptacle is empty and being adapted to receive an excess of weight on the other side thereof when said receptacle is loaded.

6. A weigh-pan comprising a receptacle having a bottom composed of two members lying within the planes of the sides of said receptacle and respectively pivoted on axes intermediate of their sides, such members normally having an excess of weight on their outer sides when said receptacle is empty and being adapted to receive an excess of weight on their inner, adjacent sides when said receptacle is loaded.

7. A weigh-pan comprising a receptacle having a bottom pivoted so as to have an excess of weight on one side of its pivotal axis when said receptacle is empty, and to have an excess of weight on the other side of such axis when said receptacle is loaded, such excess of weight being contained in both cases within the vertical planes inclosing the bottom of said receptacle.

8. A weigh-pan comprising a receptacle having a bottom so formed and pivoted as to have an excess of weight on one side of its pivotal axis when said receptacle is empty, and to have an excess of weight on the other side of such axis when said receptacle is loaded, such excess of weight being contained in both cases within the vertical planes inclosing the bottom of said receptacle.

9. A weigh-pan comprising a receptacle having a bottom pivoted so as to have an excess of weight on one side of its pivotal axis when said receptacle is empty, whereby said receptacle is closed, and to have an excess of weight on its other side when said receptacle is loaded whereby said receptacle is opened, such excess of weight being contained in both cases within the vertical planes inclosing the bottom of said receptacle, and manually-controlled means adapted to retain said bottom in its closed position.

10. A weigh-pan comprising a receptacle having a bottom composed of two members pivoted so as to have an excess of weight on one side of their pivotal axes when said receptacle is empty, whereby said members are closed, and to have an excess of weight on the other side of their pivotal axes when said receptacle is loaded, whereby said members are swung open, such excess of weight being contained in both cases within the vertical planes inclosing the bottom of said receptacle, and manually controlled means adapted to retain said members in their closed position.

11. A weigh-pan comprising a receptacle having a bottom composed of two members respectively pivoted on axes intermediate of their sides, such members normally having an excess of weight on one side of their respective axes when said receptacle is empty and being adapted to receive an excess of weight on the other side thereof when said receptacle is loaded.

12. A weigh-pan comprising a receptacle having a bottom composed of two members respectively pivoted on axes intermediate of their sides, such members normally having an excess of weight on their outer sides when said receptacle is empty and being adapted to receive an excess of weight on their inner, adjacent sides when said receptacle is loaded.

13. A weigh-pan comprising a receptacle formed of a series of transverse frames, side plates secured thereto, cross bars secured to the end frames, a longitudinal beam journaled at its ends in said cross bars, and a bottom plate mounted upon said beam, said bottom plate being so disposed as to swing shut when said receptacle is empty and to open when said receptacle is loaded.

14. A weigh-pan comprising a receptacle formed of a series of yoke angles, side plates secured thereto, cross bars secured to the end yokes, longitudinal beams journaled at their ends in said cross bars, and bottom plates mounted on said beams, such bottom plates being so disposed thereon as to swing shut when said pan is empty and to swing open when said pan is loaded.

15. A weigh-pan comprising a receptacle formed of a series of yoke angles, side plates secured thereto, cross bars secured to the end yokes, longitudinal beams journaled at their ends in said cross bars; bottom plates mounted on said beams and so disposed thereon as to swing shut when said pan is empty and to swing open when said pan is loaded, catches adapted to retain said bottom plates in their closed position, and means for releasing said catches.

16. A weigh-pan comprising a receptacle formed of a series of yoke angles, side plates secured thereto, cross bars secured to the end yokes, longitudinal beams journaled at their ends in said cross bars, and bottom plates mounted on said beams and so disposed thereon as to normally have an excess of weight on one side of their respective pivotal axes when said receptacle is empty and adapted to have an excess of weight on the other side of such axes when said receptacle is loaded.

Signed by us, this 15th day of August 1905.

FRANK C. GREENE.
CHARLES G. PALMER.

Attested by:
A. E. MERKEL,
O. V. GREENE.